(12) United States Patent
Joffe

(10) Patent No.: US 8,818,199 B2
(45) Date of Patent: Aug. 26, 2014

(54) CORRELATION SYSTEMS AND METHODS WITH ERROR COMPENSATION

(75) Inventor: Daniel M. Joffe, Owens Crossroads, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 13/367,201

(22) Filed: Feb. 6, 2012

(65) Prior Publication Data

US 2013/0202287 A1 Aug. 8, 2013

(51) Int. Cl.
*H04B 10/00* (2013.01)
*H04B 10/08* (2006.01)

(52) U.S. Cl.
USPC .............. 398/158; 398/9; 398/398; 398/16; 398/162

(58) Field of Classification Search
CPC ...................................... H04B 10/071
See application file for complete search history.

(56) References Cited

U.S. PATENT DOCUMENTS

| | | | |
|---|---|---|---|
| 5,825,516 A | 10/1998 | Walsh | |
| 6,046,797 A | 4/2000 | Spencer et al. | |
| 6,122,044 A | 9/2000 | Gautheron et al. | |
| 7,126,678 B2 | 10/2006 | Fayolle et al. | |
| 7,280,188 B2 | 10/2007 | Schmuck et al. | |
| 7,317,874 B2 | 1/2008 | Li et al. | |
| 7,440,701 B2 | 10/2008 | Li et al. | |
| 7,450,848 B2 | 11/2008 | Li et al. | |
| 7,493,042 B2 | 2/2009 | Li et al. | |
| 8,526,824 B1 * | 9/2013 | Turner et al. | 398/158 |
| 8,606,117 B1 * | 12/2013 | Turner et al. | 398/195 |
| 2002/0161542 A1 | 10/2002 | Jones et al. | |
| 2006/0066839 A1 | 3/2006 | Payton | |
| 2009/0240455 A1 | 9/2009 | Fromme et al. | |
| 2009/0257743 A1 | 10/2009 | Chung et al. | |
| 2011/0001959 A1 | 1/2011 | Hasegawa | |

FOREIGN PATENT DOCUMENTS

| | | | |
|---|---|---|---|
| EP | 1632766 A1 | 3/2004 | |
| EP | 1675280 B1 | 12/2004 | |
| EP | 1748580 A1 | 7/2005 | |

(Continued)

OTHER PUBLICATIONS

Sischka, et al., "Complimentary Correlation Optical Time-Domain Reflectometry—in respect to the HP 8145A Optical Time-Domain Reflectometer—technical," Hewlett-Packard Journal, Dec. 1988, p. 14-21.

(Continued)

*Primary Examiner* — Ken Vanderpuye
*Assistant Examiner* — Jai Lee
(74) *Attorney, Agent, or Firm* — Maynard Cooper & Gale, P.C.; Jon Holland

(57) ABSTRACT

A correlation system, such as a correlation optical time domain reflectometer (OTDR) system, transmits a correlation sequence, such as an M-sequence, and measures the returns of the correlation sequence over time. The system correlates the transmitted sequence with the returns to provide correlation measurement values that respectively correspond to different distances from the point of transmission. A correlation error compensation element estimates a correlation error floor based on at least one correlation measurement value corresponding to a point along the fiber beyond a finite impulse response (FIR) length from the transmitter. The correlation error compensation element adjusts each correlation measurement value estimate in order to cancel the contribution of the correlation error floor from the measurements to provide compensated measurement values that are substantially free of the effects of the correlation error floor.

6 Claims, 5 Drawing Sheets

(56) References Cited

FOREIGN PATENT DOCUMENTS

| EP | 1884758 A1 | 3/2006 |
|----|------------|--------|
| EP | 1901448 A1 | 9/2006 |
| EP | 1986350 A1 | 4/2007 |
| EP | 1524781 B1 | 10/2007 |

OTHER PUBLICATIONS

Takushima, et al. "In-Service OTDR for Passive Optical Networks," OSA/OFC/NFOEC, 2010.

Turner, et al, U.S. Appl. No. 12/783,999 entitled, "Systems and Methods for Unobtrusively Testing Optical Fibers," filed May 20, 2010.

* cited by examiner

CORRELATION SYSTEMS AND METHODS WITH ERROR COMPENSATION

RELATED ART

In fiber-optic communication systems, optical signals are used to carry data sometimes across great distances. It is well known that optical signals typically provide significantly higher data rates than those enabled by electrical signals. However, anomalies along an optical fiber, such as degraded splices, can adversely affect the performance of optical communication. Thus, techniques have been developed to locate fiber anomalies so that the anomalies can be repaired in order to improve communication performance.

In particular, optical time domain reflectometers (OTDRs) for detecting optical fiber anomalies have been developed and successfully used. One type of OTDR transmits a pulse along an optical fiber. A portion of the light of the pulse is returned toward the transmitter from each point along the optical fiber. As will be well known to those skilled in the art, such returns are produced by scattering of the light (Rayleigh backscatter) all along length of the fiber and in some cases by localized reflections (Fresnel reflections) at particular points along the fiber. Herein, both these sorts of optical signal returns are collectively referred to as reflections. At an anomaly, such as a degraded splice, more attenuation may occur as light passes through the splice, and in some cases more light may be reflected at this point than at other points that are free of anomalies. The OTDR measures the light returned from points along the length of the fiber and detects anomalies based on the reflected light.

Further, the OTDR can also estimate the location of the detected anomaly based on reflection delay. In this regard, each point along the optical fiber corresponds to a particular delay measured from the time of transmission by the OTDR. That is, the further the location is from the OTDR, the longer it will take for a transmitted pulse to reach the location, reflect, and return to the OTDR. Thus, the OTDR measures the amount of delay between transmission of the pulse and reception of a reflection that may indicate the presence of an anomaly. The delay corresponds to the distance of an anomaly from the OTDR, and the OTDR estimates the distance of the detected anomaly from the OTDR based on such delay.

Unfortunately, there are several significant drawbacks associated with the foregoing OTDR. In particular, data is not transmitted across the optical fiber during testing. Thus, continuous monitoring of the optical fiber is not enabled. In addition, a trade-off exists between resolution and range. In this regard, for better resolution, a more narrow pulse is desired. However, the signal is attenuated as it travels along the optical fiber, and the range of the pulse is limited. A wider pulse of any given amplitude has more light energy and, therefore, a longer range but degrades resolution.

In another type of OTDR, often referred to as a correlation OTDR, there is less of a trade-off between resolution and range because in these systems the parameter that controls range can be varied independently from the parameter that affects resolution. In a correlation OTDR, a pseudo noise (PN) sequence is transmitted along the optical fiber instead of a pulse. The PN sequence that reflects from the optical fiber is correlated with a delayed version of the transmitted PN sequence.

In this regard, the reflected PN sequence and delayed PN sequence are input into a bank of correlators for which each correlator corresponds to a discrete delay and, hence, location on the fiber. The delayed PN sequence is stepped through a delay line, and for each step, each correlator correlates (i.e., multiplies and accumulates) a respective value of the delayed PN sequence with the value of the reflected PN sequence currently received from the fiber thereby outputting a correlation value indicating to what degree the two sequences match.

The delay is controlled such that a given correlator receives a value of the delayed PN sequence when a reflection of that value would be received from the fiber location corresponding to the correlator. Accordingly, PN sequence values received from fiber locations with delays that do not correspond to a given correlator vary relative to the values from the delayed PN sequence such that the correlation values are substantially canceled by the accumulation process. However, reflected PN sequence values received from the location with a delay which does correspond to that correlator respectively match the values from the delayed PN sequence such that the correlation values accumulate to a significant number over time.

Therefore, each correlator provides an output indicative of the light reflected from a given point on the fiber and substantially independent of light reflected from other locations along the fiber. If a correlator provides an output value which is significantly different from the value that would be expected for a fiber with no anomaly at that location, then it can be determined that an anomaly likely exists at the fiber location corresponding to the correlator.

In general, light is attenuated as it propagates along a fiber, and the light reflected from points along the fiber farther away from a correlation OTDR is attenuated to a greater extent than light reflected from points close to the correlation OTDR. That is, due to line attenuation, there is greater optical path loss for the returns from points farther from the correlation OTDR. In addition, there is a correlation error floor that further degrades signal quality, particularly for returns farther from the correlation OTDR.

In this regard, in a correlation OTDR, every received return sample is essentially a composite signal made up of contributions returned from locations along the entire length of the fiber. At any given correlator, only one component of the signal is associated with the return from the corresponding fiber location. The other components are associated with other fiber locations, and these other components combine to distort the return sample from its ideal value. The error resulting from the presence of these other components is referred to as the correlation error floor. The contributions produced by these other components are scaled by $-1/N$, where N is the bit length of the PN sequence, and the correlation error floor represents an undesired contribution to the measurement. Due to the attenuation effects described above, the correlation error floor becomes more pronounced at points along the fiber further from the correlation OTDR where the optical path loss is higher. Thus, for fibers of short length, the effects of the correlation error floor may not be significant, but the correlation error floor is a more significant error source for fibers of longer length. The correlation error floor is even more significant if the fiber has in line attenuators. The equivalent of these attenuators often arises from power splitters in the optical path.

Thus, it generally would be desirable to remove the correlation error floor from the correlation values so that the effects of the correlation error floor can be compensated. However, using conventional filtering and/or noise cancellation algorithms can be problematic. Indeed, analyzing the correlation measurements mathematically in order to determine the effect of the correlation error floor and cancel it from the correlation values can be complex and, in some cases, require the inversion of very large matrices. Thus, circuitry for canceling the effects of the correlation error floor from the correlation values can be complex and expensive.

Accordingly, a heretofore unaddressed need exists in the industry for correlation systems and methods that compensate for the effects of the correlation error floor. It is generally desirable for the circuitry implementing such compensation to be relatively simple and inexpensive.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to correlation systems and methods, such as correlation optical time domain reflectometer (OTDR) systems, that compensate for error from the correlation error floor. In one exemplary embodiment, a correlation system transmits a correlation sequence, such as an M-sequence or other type of pseudo noise (PN) sequence, and measures the returns of the correlation sequence over time. The system correlates the transmitted sequence with the returns to provide correlation measurement values that respectively correspond to reflections produced at different distances from the point of transmission. A correlation error compensation element adjusts the correlation measurement values in order to cancel the contribution of the correlation error floor from the measurements to provide compensated measurement values that are substantially free of the effects of the correlation error floor. Specifically, the correlation error compensation element estimates the contribution of the correlation error floor to the measurements and subtracts such estimate from each measurement thereby canceling the effects of the correlation error floor.

The correlation error floor estimate can be determined by modeling the reflections as a finite impulse response (FIR) filter. By definition, an FIR filter has a finite length. Similarly, by definition, beyond this length, the tap values are all zero. For correlator outputs representing points in time beyond the length of the FIR filter, the outputs should all be zero. To the extent that they are non-zero, their values represent the correlation noise floor. In one exemplary embodiment, the correlation measurement values corresponding to points of the fiber beyond the length of the FIR filter are averaged to provide an average value that represents the correlation error floor estimate. This estimate is then subtracted from the measurement values from the other correlators (i.e., the correlators corresponding to points of the fiber with distances from the OTDR less than the length of the FIR filter).

For illustrative purposes, exemplary embodiments of a correlation error compensation element will be described below in the context of correlation OTDR systems. However, it should be emphasized that similar correlation error compensation elements may be employed in other types of systems that perform correlation measurements.

Figure 1:
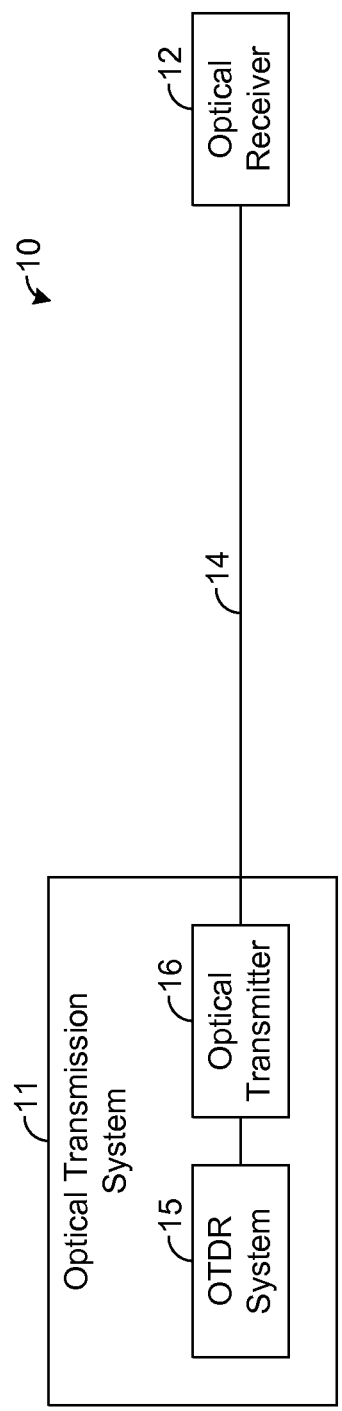
FIG. 1 is a block diagram illustrating an exemplary embodiment of a communication system in which an optical transmission system has a correlation OTDR system for unobtrusively detecting anomalies of an optical fiber while payload data is communicated across the fiber.

FIG. 1 depicts a communication system 10 having an optical transmission system 11 that transmits optical signals to an optical receiver 12 via an optical fiber 14. The transmission system 11 has a correlation OTDR system 15 coupled to an optical transmitter 16. The OTDR system 15 is configured to unobtrusively detect anomalies, such as degraded splices, along the optical fiber 14 via correlation measurements while payload data is being communicated across the fiber 14.

Figure 2:
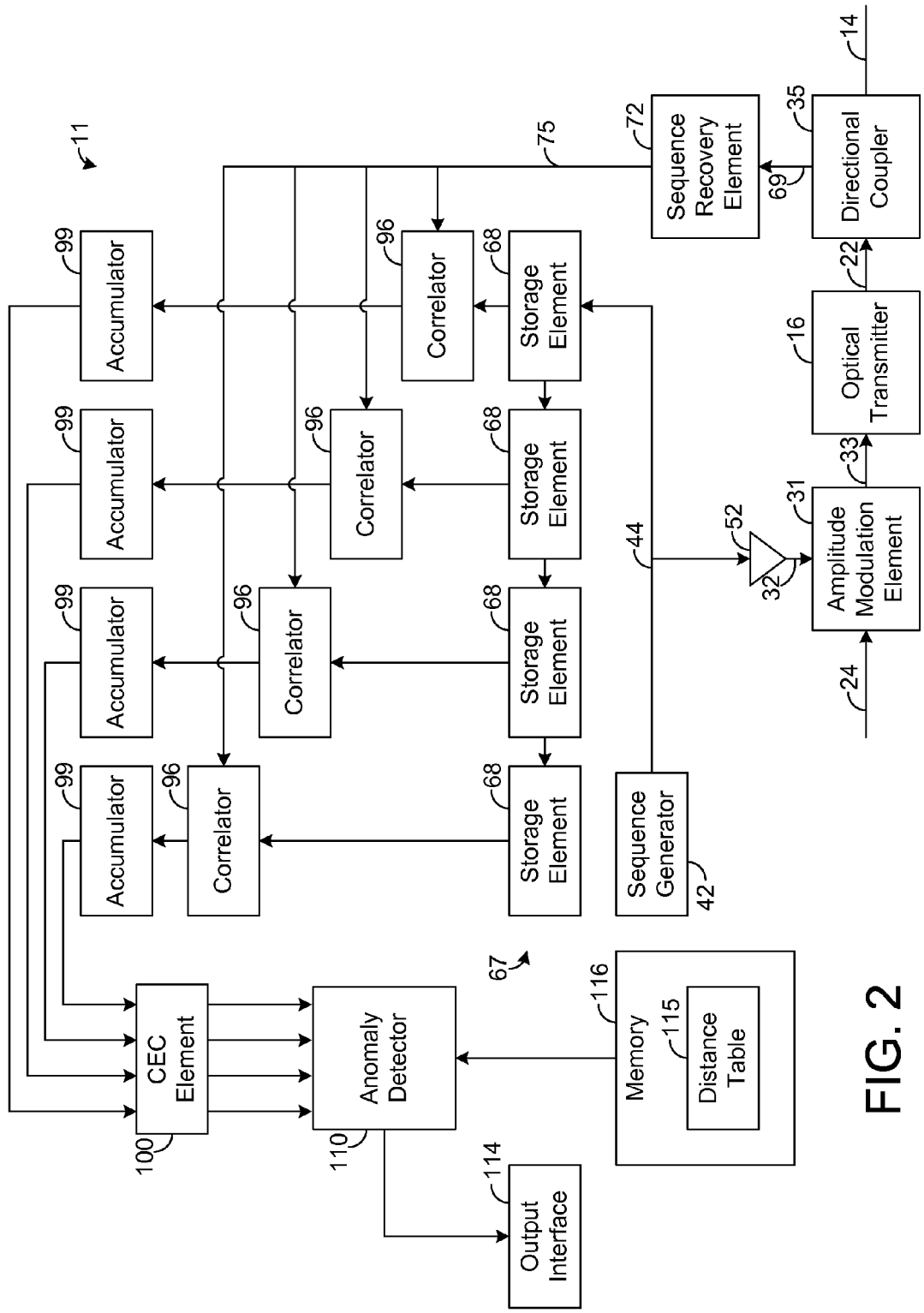
FIG. 2 is a block diagram illustrating an exemplary embodiment of an optical transmission system, such as is depicted by FIG. 1.

FIG. 2 depicts an exemplary embodiment of the optical transmission system 11. As shown by FIG. 2, the system 11 comprises an optical transmitter 16 that is configured to transmit, across an optical fiber 14, an optical data signal 22 carrying payload data from a received digital data signal 24. In this regard, the optical transmitter 16 is coupled to an amplitude modulation element 31 that is configured to modulate the pulses of the digital data signal 24 with an OTDR signal 32, as will be described in more detail hereafter, to provide an amplitude modulated (AM) data signal 33. The optical transmitter 16 is also coupled to a directional coupler 35 that is coupled to the optical fiber 14, as shown by FIG. 2. The optical transmitter 16 converts the AM data signal 33 to an optical data signal 22 that is transmitted through the directional coupler 35 to the optical fiber 14, which carries the optical signal 22 to the optical receiver 12 (FIG. 1) at a remote location. The optical receiver 12 detects the payload data and further processes the payload data as may be desired.

A sequence generator 42 generates a correlation sequence 44. As used herein, a "correlation sequence" refers to any digital data sequence that is used to perform correlation measurements. In one exemplary embodiment, the correlation sequence 44 is a PN sequence, such as an M-sequence. As known in the art, an M-sequence has correlation properties that generally make this type of sequence preferred for many correlation measurement applications, including anomaly detection. However, other types of digital data sequences, such as a random data sequence, may be used in other embodiments. For illustrative purposes, it will be assumed hereafter that the correlation sequence 44 is a PN sequence and, more specifically, an M-sequence.

An amplifier 52 amplifies values of the correlation sequence 44 to a desired level depending on the amplitude of the digital data signal 24 to provide the OTDR signal 32 that is to be combined with the digital data signal 24 via amplitude modulation. In one exemplary embodiment, the OTDR signal 32 has a frequency smaller than that of the digital data signal 24, and the modulation performed by the amplitude modulation element 31 affects the amplitude of the digital data signal 24 by a small percentage, such as less than about 10% of the peak amplitude of the digital data signal 24 in an effort to keep interference with the signal 24 low. In this regard, increasing the amplitude of the OTDR signal 32 generally improves the performance of the OTDR measurements but also increases the interference introduced to the digital data signal 24 by the amplitude modulation element 31. In other embodiments, other amplitude percentages are possible. Limiting the modulation such that it affects the amplitude of the data signal 24 by no more than a small amount, such as about 10%, helps to ensure that the optical receiver 12 (FIG. 1) is able to recover the payload data defined by the digital data signal 24.

As shown by FIG. 2, the sequence generator 42 is coupled to a delay line 67 through which the correlation sequence 44 is serially shifted. In this regard, the delay line 67 has a plurality of storage elements 68, and each storage element 68 stores a respective value (i.e., +1 or −1) of the correlation sequence 44 as it is being shifted through the delay line 67.

During transmission, portions of the optical signal 22 reflect back toward the optical transmitter 16 as it travels along the optical fiber 14. The amplitude of the optical signal 22 that is reflected at each location is affected by normal backscattering and by line anomalies, such as degraded splices. The directional coupler 35 receives from the fiber 14 an optical signal 69, referred to hereafter, as the "reflected optical signal," comprising the reflections of the optical signal 22 as it travels along the fiber 14. The directional coupler 35 transmits the reflected optical signal 69 to a sequence recovery element 72, which converts the optical signal reflections to digital samples 75 defining a sequence of digital values. In one exemplary embodiment, the digital samples 75 are serially transmitted at the same frequency as the correlation sequence 44.

Figure 3:
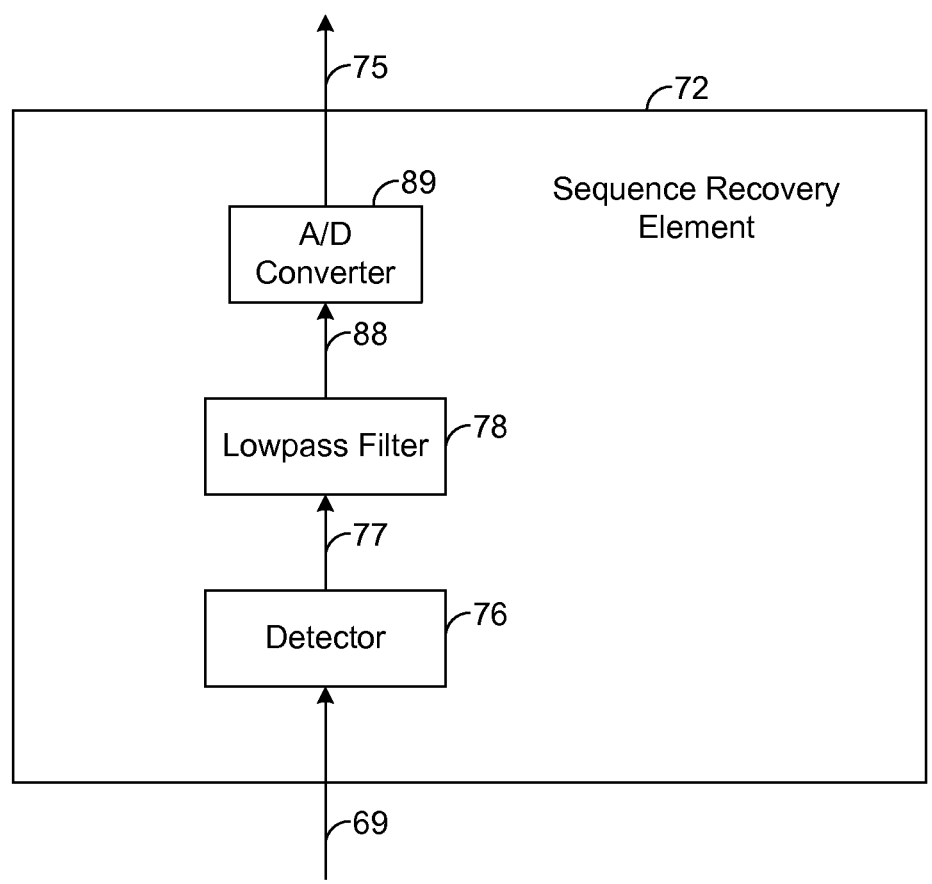
FIG. 3 is a block diagram illustrating an exemplary embodiment of a sequence recovery element, such as is depicted by FIG. 2.

FIG. 3 depicts one exemplary embodiment of the sequence recovery element 72. In this embodiment, the element 72 has a detector 76 that receives the reflected optical signal 69 and converts the optical signal 69 to an analog electrical signal 77. A lowpass filter 78 filters the analog signal 77 in order to substantially remove the high frequency optical modulation associated with the payload data signal 24 and simultaneously remove direct current (DC) offset from the signal, while passing the modulation associated with the PN sequence OTDR signal 44, providing a filtered signal 88 having amplitude appropriate for analog-to-digital conversion. An analog-to-digital (A/D) converter 89 converts the analog signal 88 to digital values. In this regard, the sequence recovery element 72 is configured to output digital values 75, referred to as "samples," and each digital sample 75 is based on reflected signal components that have been reflected from points along the fiber 14. Each such signal component is indicative of the correlation sequence value used to modulate its contribution to such sample 75. That is, the digital value 75 represents the sum of reflected signal components that have been reflected at different points along the fiber 14, and each such signal component has been modulated by a respective correlation sequence value.

The digital sample 75 recovered by the element 72 is transmitted to a plurality of correlators 96 respectively coupled to the storage elements 68 of the delay line 67, as shown by FIG. 2. Each correlator 96 correlates (i.e., multiplies and accumulates) successive digital samples 75 with values stored in a respective one of the storage elements 68. As will be described in more detail hereafter, the correlation sequence 44 is serially shifted through the storage elements 68 of the delay line 67. As shown by FIG. 2, the correlators 96 are respectively coupled to plurality of accumulators 99 that receive the output values, referred to hereafter as "correlation values," of the correlators 96.

Each accumulator 99 accumulates the correlation values from a respective correlator 96 to further enhance the accuracy of the correlation values. Note that use of the accumulators 99 is optional. If desired, anomaly decisions may be based on the correlation values from the correlators 96 without additional accumulation by the accumulators 99. Furthermore, the accumulators 99 may be renormalized by rescaling periodically to avoid overflow, or reset to zero if desired at the initiation of a new testing interval, or both.

As shown by FIG. 2, the accumulators 99 are coupled to a correlation error compensation (CEC) element 100. As will be described in more detail hereafter, the CEC element 100 processes the correlation values from the accumulators 99 in order to remove error attributable to the correlation error floor. That is, the CEC element 100 adjusts each correlation value, x, from a respective accumulator 99 in order to provide a compensated correlation value, y, that is substantially free of the effects of the correlation error floor. If the accumulators 99 are not used, the CEC element 100 may similarly compensate correlation values received directly from the correlators 96.

Note that each correlator 96 corresponds to a respective location along the optical fiber 14. In this regard, for a given correlator 96, there is a finite delay from the time that a value of the correlation sequence 44 is transmitted by the optical transmitter 16 until the value is shifted into the storage element 68 that is coupled to the correlator 96. Such delay shall be referred to as the correlator's "sequence delay." Further, each point along the optical fiber 14 has a reflection delay that is based on the point's distance from the optical transmitter 16. As used herein, a point's "reflection delay" is the amount of time for a sample to travel from the optical transmitter 16 to the point, return to the detector 76, and reach the correlator 96. Generally, the further the point is from the optical transmitter 16, the greater is the point's reflection delay.

Moreover, the fiber location corresponding to a particular correlator 96 is that location along the fiber 14 where the reflection delay is equal to the correlator's sequence delay. Thus, if a particular correlation sequence value ($V_1$) transmitted by the optical transmitter 16 is reflected at the point along the fiber 14 corresponding to a given correlator 96, then the transmitted value ($V_1$) should have been delayed by the delay line 67 such that it is in the storage element 68 coupled to the correlator 96 when the reflection of the value ($V_1$) is received from the fiber 14 by such correlator 96. Therefore, at the inputs to the correlator 96, the algebraic sign of the value ($V_1$) should match the algebraic sign of the signal component reflected from the corresponding point along the fiber. Note that, for each correlator 96, the accumulator 99 that accumulates correlation values from the correlator 96 and the storage element 68 that provides correlation sequence values to the correlator 96 also correspond to the same fiber location as the correlator 96. Moreover, the storage element 68 corresponding to a particular fiber location is that storage element 68 that is storing a value ($V_1$) when the reflection of such value is received from the fiber 14 by the correlator 96 that correlates such value.

In addition, each correlator 96 is implemented as a multiplier followed by an accumulator, and the correlation value in each correlator 96 is reset (e.g., re-initialized to a value of zero) at the end of each period or an integer number of periods of the correlation sequence 44, after the correlation result has been accumulated by the associated accumulator 99 and transferred to the anomaly detector 110 (FIG. 2) through the CEC element 100. In one exemplary embodiment, the correlation sequence 44 is an M-sequence comprising a particular succession of values of +1 and −1. Accordingly, for each correlator 96, the input from a storage element 68 is either a value of +1 or a value of −1. Thus, when the input from a storage element 68 to the correlator 96 has the same algebraic sign as a reflected signal component appearing at the other input, then the correlator 96 outputs a value containing a component corresponding to these inputs that is greater than zero. In particular, if the inputs for the M-sequence value and for a reflected signal component with the corresponding delay both have positive algebraic signs, then the product of these inputs provides a contribution to the output that is greater than zero. Further, if the inputs for the M-sequence value and for a reflected signal component with the corresponding delay both have negative algebraic signs, then the product of these inputs provides a contribution to the output that also is greater than zero.

For contributions to the signal sample 75 reflected from a location on the fiber 14 with delay corresponding to the sequence delay for the correlator 96, the algebraic signs of the inputs match, and the correlation value is indicative of these signal contributions. However, for contributions to the signal sample 75 from all points on the fiber 14 where the reflection delay does not correspond to the correlator sequence delay for the correlator 96, the signs of the signal contributions from such locations are not related to the sign of the M-sequence input to the correlator 96, so that the products involving such signal contributions are approximately equally likely to be positive or negative, accumulating approximately to a zero value across the interval spanned by each period of the M-sequence. In this regard, the M-sequence is preferred in minimizing correlation spanning a full period of the sequence at all offset delay values other than zero delay, which is well known to one of ordinary skill in the art, minimizing signal contributions from all points where the reflection delay does not correspond to the sequence delay for correlator 96. Therefore, each correlator 96, as well as its associated accumulator 99, provides a value which is indicative of the amount of light reflected from the corresponding location along the fiber and substantially independent of the amount of light reflected from all other locations along the fiber 14.

As known in the art, a fiber-optic line free of anomalies exhibits reflections along its length with amplitudes that are reduced in a uniform manner with increasing distance from the point where the signal is transmitted into the fiber. Furthermore, this reduction in reflected light with distance for such a fiber free from anomalies follows a predictable, nominal characteristic rate of attenuation corresponding to the parameters of the particular fiber involved. However, for a fiber with an anomaly, at the point where a line anomaly (e.g., a degraded splice) exists, more attenuation may occur as light passes through the anomaly, and in some cases more light may be reflected at this point than at other points that are free of anomalies.

Moreover, the values from the accumulators 99 can be analyzed to identify the locations of anomalies, such as degraded splices, along the fiber 14. In this regard, a described above, it is generally expected for the correlation values corresponding to points further from the transmitter 16 to gradually decrease. If an accumulator value is larger than expected, then anomaly is detected for the point corresponding to the abnormally large correlation value. The anomaly detector 110 is configured to analyze the compensated correlation values from the CEC element 100 and to detect anomalies based on such values. The anomaly detect 110 may report (e.g., display or transmit messages) not only the presence of the anomaly but also its estimated location along the fiber 14.

The foregoing techniques for comparing correlation values in order to detect anomalies are presented for illustrative purposes. It should be emphasized that other types of comparisons and techniques for detecting anomalies based on the data provided by the correlators 96 are possible in other embodiments. Commonly-assigned U.S. patent application Ser. No. 12/783,999, entitled "Systems and Methods for Unobtrusively Testing Optical Fibers" and filed on May 20, 2010, which is incorporated herein by reference, describes exemplary embodiments of correlation OTDR systems.

Note that, in one exemplary embodiment, the components of the OTDR system 15 are implemented in hardware. However, in other embodiments, it is possible for various components to be implemented in hardware, software, firmware, or combinations thereof.

Notably, the OTDR system 15 allows for the testing of the fiber 14 for anomalies while simultaneously communicating payload data along the fiber 14. In this regard, the modulation of the digital data signal 24 with the correlation sequence 44 is kept small enough such that the receiver 12 is able to recover the payload data despite the small amount of noise introduced by such modulation. Thus, simultaneous anomaly testing and data communication is achieved without significantly impairing the communication performance of the system 10. However, in other embodiments, other configurations are possible. As an example, data transmission may be temporarily stopped during the correlation measurements performed by the system 15. In such an embodiment, the amplitude of the correlation sequence transmitted across the fiber 14 may be greater since interference with data communication is not a concern.

Figure 4:
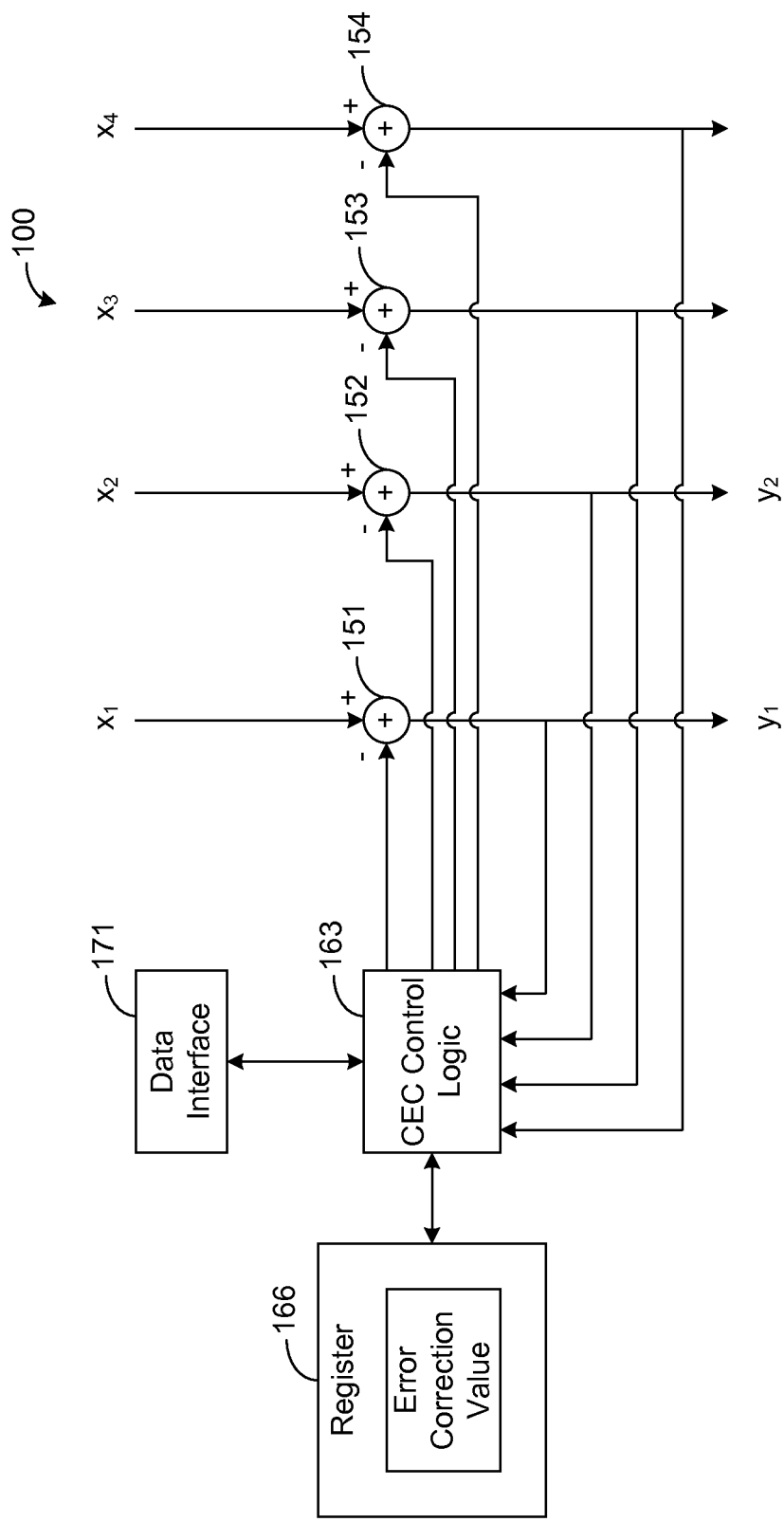
FIG. 4 is a block diagram illustrating an exemplary embodiment of a correlation error compensation (CEC) element, such as is depicted by FIG. 2.

In addition, various techniques may be used by the CEC element 100 in order to compensate correlation values (e.g., accumulated correlation values from the accumulators 99 or correlation values directly from the correlators 96) for the effects of the correlation error floor. An exemplary embodiment of the CEC element 100 is depicted in FIG. 4. As shown by FIG. 4, the CEC element 100 comprises a bank of summers 151-154. Each summer 151-154 is coupled to a respective correlator 96 and accumulator 99 (if implemented), and each summer 151-154 receives as input the correlation value from the respective correlator 96 or accumulator 99 (if implemented) coupled to it. For purposes of simplicity, FIG. 4 shows the CEC element 100 as receiving only four input correlation values, $x_1$-$x_4$, but there may be many more input correlation values (e.g., hundreds or thousands) in other embodiments. As described above, each input correlation value corresponds to a respective point along the fiber 14 and generally indicates whether an anomaly exists at such corresponding point, except as may be otherwise described herein.

As shown by FIG. 4, the CEC element 100 comprises CEC control logic 163 for generally controlling the operation of the CEC element 100, as will be described in more detail hereafter. In one exemplary embodiment, the CEC control logic 163 is implemented in hardware, such as a field programmable gate array (FPGA), but in other embodiments, the CEC control logic 163 may be implemented in hardware, software, firmware, or any combination thereof.

The CEC control logic 163 has access to a value, referred to hereafter as the "error correction value," which represents an estimate of the correlation error floor affecting the correlation values received by the CEC element 100. In one exemplary embodiment, the error correction value is stored in a register 166 of the CEC element 100, but the error correction value may be stored in other types of memory in other embodiments. The CEC control logic 163 is configured to retrieve the error correction value from the register 166 and to transmit the error correction to a plurality of summers 151-154, and each summer 151-154 receiving the error correction value is configured to subtract such value from its respective input correlation value, x, thereby canceling the effect of the correlation error floor on such correlation value and providing a compensated correlation value, y.

Note that the circuitry of the CEC element 100 is arranged to permit the control logic 163 to transmit the error correction value to any summer 151-154 so that any of the input correlation values, $x_1$-$x_4$, can be compensated. However, as will be described in more detail below, the CEC control logic 163 may be configured to transmit the error correction value to less than all of the summers 151-154 so that only a portion of the input correlation values are actually compensated. The uncompensated correlation values may be used to calculate the error correction value, as will be described in more detail hereafter.

As shown by FIG. 4, the control logic 163 is coupled to a data interface 171 for receiving inputs and providing outputs. As an example, the data interface 171 may comprise a keypad for allowing users to provide inputs, and the data interface 171 may comprise a display device, such as a liquid crystal display (LCD), for allowing outputs to be displayed to a user. Alternatively, the data interface 171 may be a serial interface, such as an RS-232 interface, for allowing the CEC element 100 to exchange data with an external device. Yet other configurations of the data interface 171 are possible in other embodiments. In addition, the CEC control logic 163 is configured to receive the correlation values passing through the CEC element 100.

Note that there is a point along the fiber 14 for which the OTDR system 11 is unable to receive meaningful returns. In this regard, as described above, light is attenuated as it propagates through a fiber. A point along the fiber is reached where a return from such point, as measured at the transmitter 16, is so small such that it cannot be effectively discerned from the noise floor. Such point is generally located a distance from the transmitter 16 equal to the fiber's finite impulse response (FIR) length for a given transmission level. Moreover, the returns measured by the OTDR system 11 are not substantially attributable to light reflected from any point along the fiber 14 at the FIR length or beyond but rather are primarily attributable to the reflections at points all along the length of the fiber 14 up to the FIR length. Thus, the correlation value of any correlator 96 corresponding to a point at or beyond the FIR length (i.e., corresponding to a point having a distance from the transmitter 16 equal to or greater than the FIR length for the transmitted correlation sequence) represents a measurement of the correlation error floor.

In one exemplary embodiment, such a measurement is used as the error correction value and, thus, is subtracted from at least one input correlation value, x, in order to compensate x for the correlation error floor. In another exemplary embodiment, as will be described in more detail hereafter, the correlation error floor estimate is smoothed by averaging the correlation values for multiple points at or beyond the FIR length, but such smoothing is unnecessary. Indeed, it is possible to estimate the error correction value stored in register 166 using any number of uncompensated input correlation values, x, from one or more correlators 96 or accumulators 99 (if implemented) corresponding to one more points at or beyond the FIR length of the fiber 14.

Preferably, the control logic 163 is configured to identify at least one input correlation value, $x_1$-$x_4$, corresponding to a point along the fiber 14 at or beyond the fiber's FIR length. Based on such input correlation value, the control logic 163 is configured to estimate the error correction value and store the error correction value in the register 166. Thereafter, the control logic 163 is configured to transmit the error correction value to at least one summer 151-154 receiving an input correlation value, x, corresponding to a point along the fiber 14 before the FIR length (i.e., corresponding to a point having a distance from the transmitter 16 less than the FIR length for the transmitted correlation sequence). Such summer then subtracts the error correction value from the received input correlation value, x, in order to compensate x for the correlation error floor, thereby providing a compensated correlation value, y, that is substantially free of error caused by the correlation error floor.

Note that there are various techniques that may be used to identify which of the input correlation values correspond to points at or beyond the FIR length of the fiber 14. In one exemplary embodiment, the control logic 163 receives user input via the data interface 171 for identifying the input correlation values to be used for estimating the error correction value. Exemplary techniques for identifying such input correlation values based on user input will be described in more detail below with particular reference to FIG. 5.

Initially, the OTDR system 11 begins to perform measurements without compensating any of the input correlation values for the correlation error floor. In this regard, the CEC control logic 163 may be configured to refrain from transmitting input signals to the summers 151-154 so that the summers 151-154 do not change their respective input correlation values, $x_1$-$x_4$. Accordingly, the correlation values received by the CEC control logic 163 should match the input correlation values for the CEC element 100.

The CEC control logic 163 is configured to transmit at least one sample of input correlation values, $x_1$-$x_4$, to the data interface 171 so that these values can be analyzed by a user. As an example, a plot of the input correlation values, $x_1$-$x_4$, versus distance from the transmitter 16 may be displayed to a user via the data interface 171 or an external device (not shown) that is connected to or in communication with the data interface 171. It is generally expected that the input correlation values corresponding to points further from the transmitter 16 should be less such that the displayed curve has a generally negative slope until a point is reached where the values become substantially constant (i.e., the slope approaches 0). Such point is at or close to the FIR length of the fiber 14 for the transmitted correlation sequence. In one exemplary embodiment, the user provides an input for identifying or indicating the foregoing point. The correlation values corresponding to points at or beyond the identified point are then used to estimate the error correction value, as will be described in more detail hereafter. In another exemplary embodiment, the point corresponding to the FIR length are automatically identified by the CEC control logic 163 by analyzing the input correlations values, $x_1$-$x_4$.

Figure 5:
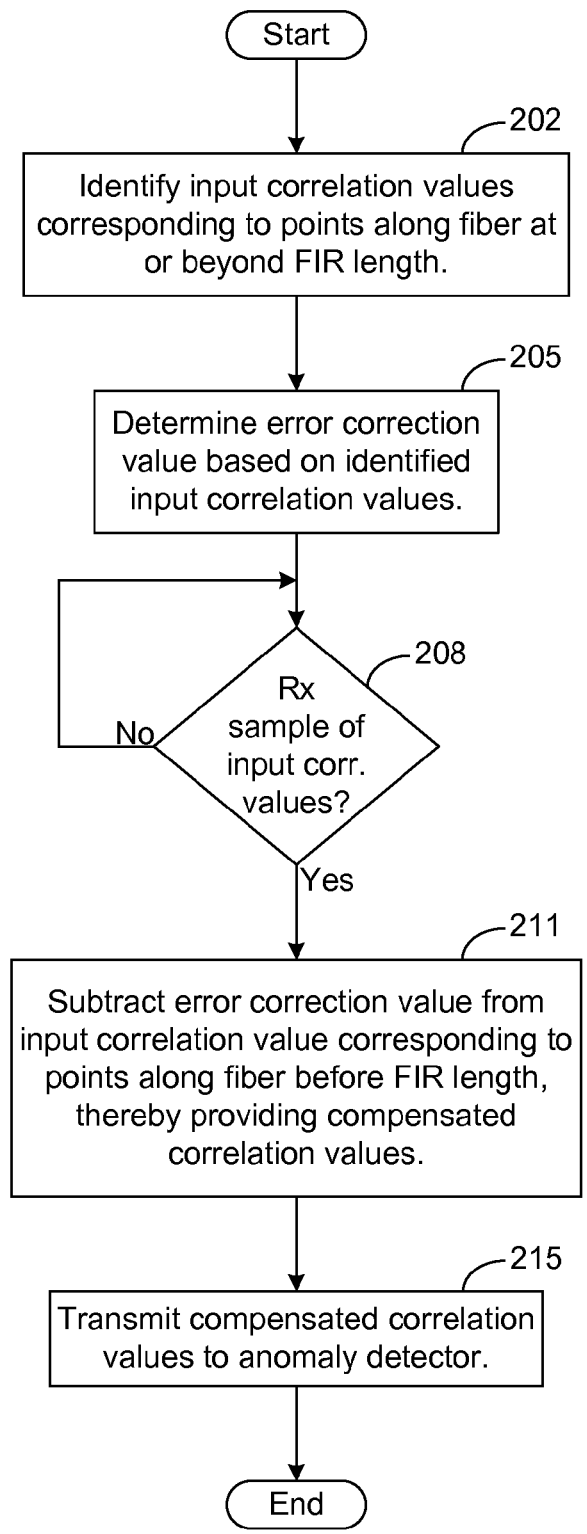
FIG. 5 is a flowchart illustrating an exemplary method of adjusting correlation values to compensate for the correlation error floor.

Based on the point corresponding to the approximate FIR length, the CEC logic 163 is configured to identify input correlation values that correspond to points along the fiber 14 at or beyond the FIR length, as shown by block 202 of FIG. 5. For illustrative purposes, assume hereafter, that the input correlation values $x_1$ and $x_2$ correspond to points along the fiber 14 before the FIR length (i.e., have distances from the transmitter 16 less than the FIR length) and that the input correlation values $x_3$ and $x_4$ correspond to points along the fiber 14 beyond the FIR length.

As shown by block 205 of FIG. 5, the CEC control logic 163 is configured to determine the error correction value based on the input correlation values $x_3$ and $x_4$ identified in step 202. In one exemplary embodiment, the CEC control logic 163 is configured to average the input correlation values $x_3$ and $x_4$ in order to calculate an estimate of the correlation error floor. The CEC control logic 166 stores such estimate in the register 166 as the error correction value that is to be used for compensating for the correlation error floor. In this regard, for each sample received by the CEC element 100 after calculating the error correction value, the CEC control logic 163 transmits the error correction value to the summers 151 and 152 that receive the input correlation values $x_1$ and $x_2$ corresponding to points before the FIR length so that these summers 151 and 152 subtract the error correction value from such input correlation values $x_1$ and $x_2$, respectively, thereby providing compensated correlation values $y_1$ and $y_2$ substantially free of the effects of the correlation error floor, as shown by blocks 208 and 211 of FIG. 5. As shown by block 215 of FIG. 5, the compensated correlation values $y_1$ and $y_2$ are transmitted to the anomaly detector 110, which is configured to detect anomalies based on such values $y_1$ and $y_2$ using techniques known in the art. Since the values $y_1$ and $y_2$ have been compensated for the correlation error floor, the results of the anomaly detector 110 should be more accurate.

In various embodiments described above, the CEC element 100 is described in the context of an OTDR system 15 that embeds the correlation sequence in a data signal. However, it should be emphasized that the CEC element 100 may be similarly used in other types of correlation systems, such as OTDR systems that do not attempt to embed the correlation sequence in a data signal. Such an OTDR system may be configured in the same way as the one shown by FIG. 2 except that the correlation sequence is not used to modulate a data signal but rather is used to modulate an optical signal that carries the correlation sequence only. In addition, the CEC element 100 may be used in non-OTDR correlation systems. As an example, the CEC element 100 may be used in a radar system that wirelessly transmits a correlation sequence and correlates the returns with the transmitted sequence, as is described in the above OTDR embodiments. There are various other types of correlation systems that may employ the CEC element 100 in order to cancel contributions of the correlation error floor from correlation measurements.

In addition, as described above, the use of the accumulators 99 is unnecessary, and anomaly detections may be based on correlation values from the correlators 96 without the additional accumulation provided by the accumulators 99. In such an embodiment, the CEC element 100 may compensate the correlation values from the correlators 96 via the same techniques described above. In this regard, the configuration of the CEC element 100 may be identical to that shown by FIG. 4, and the values $x_1$ to $x_4$ may represent the correlation values respectively output by the active correlators 96. Various other modifications and changes would be apparent to a person of ordinary skill upon reading this disclosure.

Now, therefore, the following is claimed:

1. A correlation system, comprising:
a transmitter configured to transmit a correlation sequence;
receive circuitry configured to receive a plurality of returns from the transmitted correlation sequence;
a plurality of correlators coupled to the receive circuitry and configured to correlate the correlation sequence with the returns to provide a set of correlation measurement values respectively associated with the returns, wherein the set comprises a respective correlation measurement value from each of the correlators, each of the correlation measurement values corresponding to a respective distance from the transmitter and indicative of a condition at the corresponding distance;
a correlation error compensation (CEC) element configured to identify at least one of the correlation measurement values corresponding to a distance from the transmitter greater than at least a finite impulse response (FIR) length for the transmitted sequence, the CEC element further configured to define a value indicative of a correlation error floor for the returns based on the one correlation measurement value identified by the CEC element, wherein the CEC element is configured to combine the value indicative of the correlation error floor with at least one of the correlation measurement values thereby canceling the correlation error to provide at least one compensated correlation measurement value.

2. The system of claim 1, further comprising:
an optical fiber coupled to the transmitter; and
an anomaly detector configured to detect an anomaly along the optical fiber based on the correlation measurement values.

3. A correlation system, comprising:
an optical transmitter coupled to an optical fiber and configured to transmit a correlation sequence through the optical fiber;
receive circuitry configured to receive a plurality of returns from the transmitted correlation sequence;
a plurality of correlators coupled to the receive circuitry and configured to correlate the correlation sequence with the returns to provide a set of correlation measurement values respectively associated with the returns, each of the correlation measurement values corresponding to a respective distance from the optical transmitter;
a correlation error compensation (CEC) element configured to identify at least one of the correlation measurement values corresponding to a distance from the optical transmitter greater than at least a finite impulse response (FIR) length for the transmitted sequence, the CEC element further configured to define a value indicative of a correlation error floor for the returns based on the one correlation measurement value identified by the CEC element, wherein the CEC element is configured to combine the value indicative of the correlation error floor with at least one of the correlation measurement values thereby canceling correlation error to provide at least one compensated correlation measurement value; and
an anomaly detector configured to detect an anomaly along the optical fiber based on the compensated correlation measurement value.

4. The system of claim 3, wherein a plurality of the correlation measurement values correspond to distances from the optical transmitter greater than the FIR length, and wherein the CEC element is configured to average the plurality of the correlation measurement values.

5. A correlation method, comprising:
transmitting a correlation sequence from a transmitter;
receiving a plurality of returns from the transmitted correlation sequence;
correlating the returns with the correlation sequence to provide a plurality of correlation measurement values respectively associated with the returns, wherein each of the plurality of correlation measurement values corresponds to a respective distance from the transmitter;
identifying at least one of the correlation measurement values corresponding to a distance from the transmitter greater than at least a finite impulse response (FIR) length for the transmitted sequence;
defining a value indicative of a correlation error floor for the returns based on the identified correlation measurement value; and
canceling correlation error from the plurality of correlation measurement values, wherein the canceling comprises combining the value indicative of the correlation error floor with at least one of the correlation measurement values.

6. The method of claim 5, wherein the transmitting comprises transmitting the correlation sequence through an optical fiber, and wherein the method further comprises detecting an anomaly along the optical fiber based on the plurality of correlation measurement values.

* * * * *